Dec. 19, 1967 — W. R. SMITH ET AL — 3,358,613
VEHICLE CONTROL SYSTEM
Filed Oct. 23, 1965 — 6 Sheets-Sheet 1
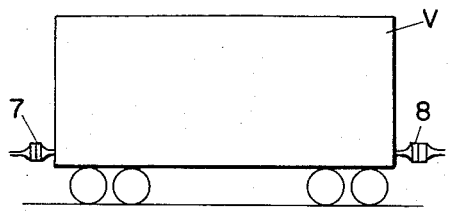
FIG. IA
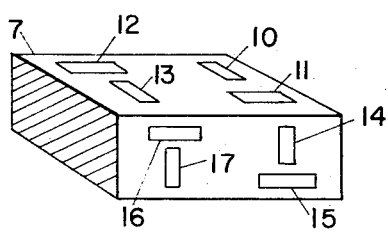
FIG. IB
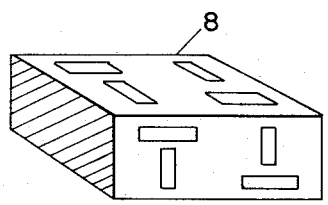
FIG. IC
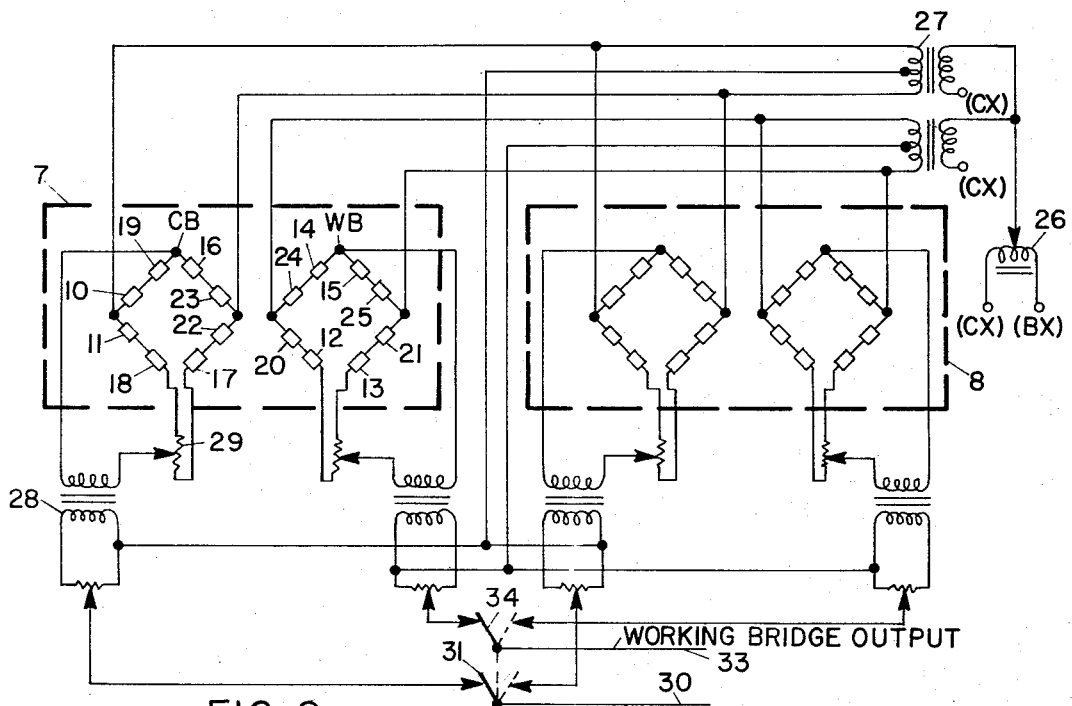
FIG. 2
LEFT-RIGHT COUPLER SELECTOR 32
CHECKING BRIDGE OUTPUT 30
WORKING BRIDGE OUTPUT 33
INVENTOR.
W. R. SMITH,
C. S. WILCOX AND
J. A. SNELL
BY
*Forest B. Hitchcock*
THEIR ATTORNEY

INVENTOR.
W.R. SMITH,
C.S. WILCOX AND
J.A. SNELL
BY
THEIR ATTORNEY

TO POWER TERMINALS
OF FIGS. 4A, 4B, AND 4C
DESIGNATED AS (B+)

United States Patent Office 3,358,613
Patented Dec. 19, 1967

3,358,613
VEHICLE CONTROL SYSTEM
Willis R. Smith, Clinton S. Wilcox, and John A. Snell, Rochester, N.Y., assignors to General Signal Corporation, Rochester, N.Y., a corporation of New York
Filed Oct. 23, 1965, Ser. No. 503,649
10 Claims. (Cl. 105—61)

ABSTRACT OF THE DISCLOSURE

Automatic throttle control means for a helper locomotive comprises apparatus for stepping the locomotive throttle up and down as required to match a signal characteristic of the tractive effort of the locomotive with a desired power signal computed by multiplying an actual vehicle speed signal by a force signal obtained from strain gauges in a vehicle coupling. The integrity of the computing means and of the force measurement is intermittently checked by comparing a checking bridge of strain gauges with a corresponding working bridge of strain gauges and by intermittently checking the ability of the computing means to compute different throttle settings in response to different combinations of fixed signals comparable to force speed signals.

Background of invention

This invention relates to vehicle control systems, and it more particularly pertains to systems for the automatic control of vehicles in accordance with a generated error signal.

This invention is particularly useful to control a helper locomotive, or comparable tractive power vehicle, which may be disposed at an intermediate point in a train, for example, wherein it is desired that the locomotive be controlled in accordance with forces exerted in a car coupling of the train by a main locomotive. Upon measuring the force in the coupling and obtaining a signal characteristic of such force, the desired horsepower can be obtained by multiplying the force signal with a signal indicative of the speed of the train. If the force is measured in a car coupling in the rear of the helper locomotive, the power developed by the helper locomotive must be compared with the computed desired horsepower signal in order to generate an error signal indicative of the action required in control of the helper locomotive in order that the helper locomotive will carry its share of the train load. The error signal may be of one polarity or another, for example, in accordance with whether more or less power is required of the helper locomotive.

Summary of invention

The system according to the present invention provides a fail-safe self-checking control system for a helper locomotive, or comparable tractive power vehicle, wherein the ability of strain gauges to properly measure the force in a coupling is intermittently checked, and a check is made intermittently of the ability of computing apparatus to compute each of a plurality of test throttle settings. The system uses two identical strain gauge bridges in the car coupler, one being conveniently called a working bridge, and the other being called a checking bridge. Outputs of these bridges are intermittently compared to determine the integrity of the force sensing apparatus. During the times when the working and checking bridges are being compared, the computing apparatus is also tested by solving first for throttle settings within a predetermined range, in accordance with fixed input settings characteristic of a typical test speed, and secondly solving for the ability of the computer to select an idle throttle position when the fixed test speed input signal is removed.

More specifically, the error signal is applied as a plus or minus signal to an integrator which provides output pulses for stepping up or stepping down a binary counter in accordance with the character of the error signal. Circuit logic is provided for resetting the integrator in reto the generation of an output pulse, and the integrator is effective to generate the next pulse at the end of a time interval that is selected in accordance with the then existing mode of the system. If the system is in a checking mode, a relatively short interval is selected; if the system is calling for reduced throttle, a second time interval is selected; and if the system is calling for advance of the throttle, a third time interval is selected. Timing means is provided which renders the system alternately in checking and control modes, and the ability of the system when in a control mode to govern the tractive effort of the locomotive is at all times dependent upon the integrity of the system as determined intermittently when the system is in the checking mode.

An object of the present invention is to check the integrity of computing apparatus for controlling the tractive effort of a locomotive in accordance with the sensing of a force signal in a vehicle coupling.

Another object of the present invention is to operate a locomotive tractive effort control system in checking and control modes alternately, wherein computing means which is common to both modes is checked so as to permit the control of the tractive effort of a locomotive only so long as the system is properly checked intermittently.

Other objects, purposes and characteristic features of the present invention will be in part obvious from the accompanying drawings and in part pointed out as the description of the invention progresses.

In describing the invention in detail, reference is made to the accompanying drawings wherein similar reference characters are used throughout the several figures to illustrate corresponding parts, and wherein;

FIG. 1A illustrates a vehicle having car couplings including strain gauges;

FIG. 1B shows in an enlarged sectional view a typical arrangement of strain gauges in the left-hand vehicle coupling;

FIG. 1C shows in an enlarged sectional view a typical arrangement of strain gauges in the right-hand vehicle coupling;

FIG. 2 shows a system for generating working and checking force sensing signals characteristic of force in the vehicle couplings;

Figure 4A:
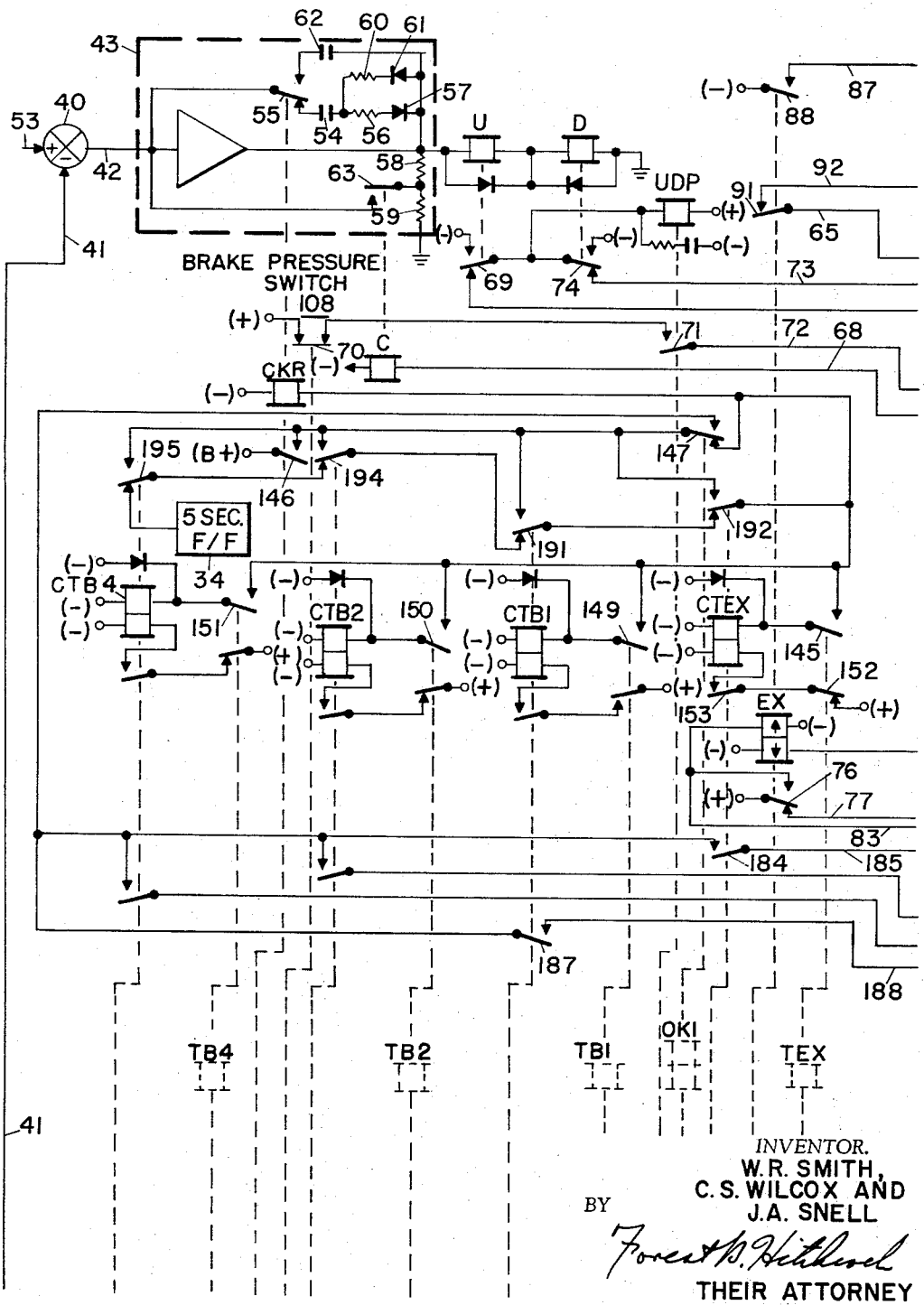
Figure 4B:
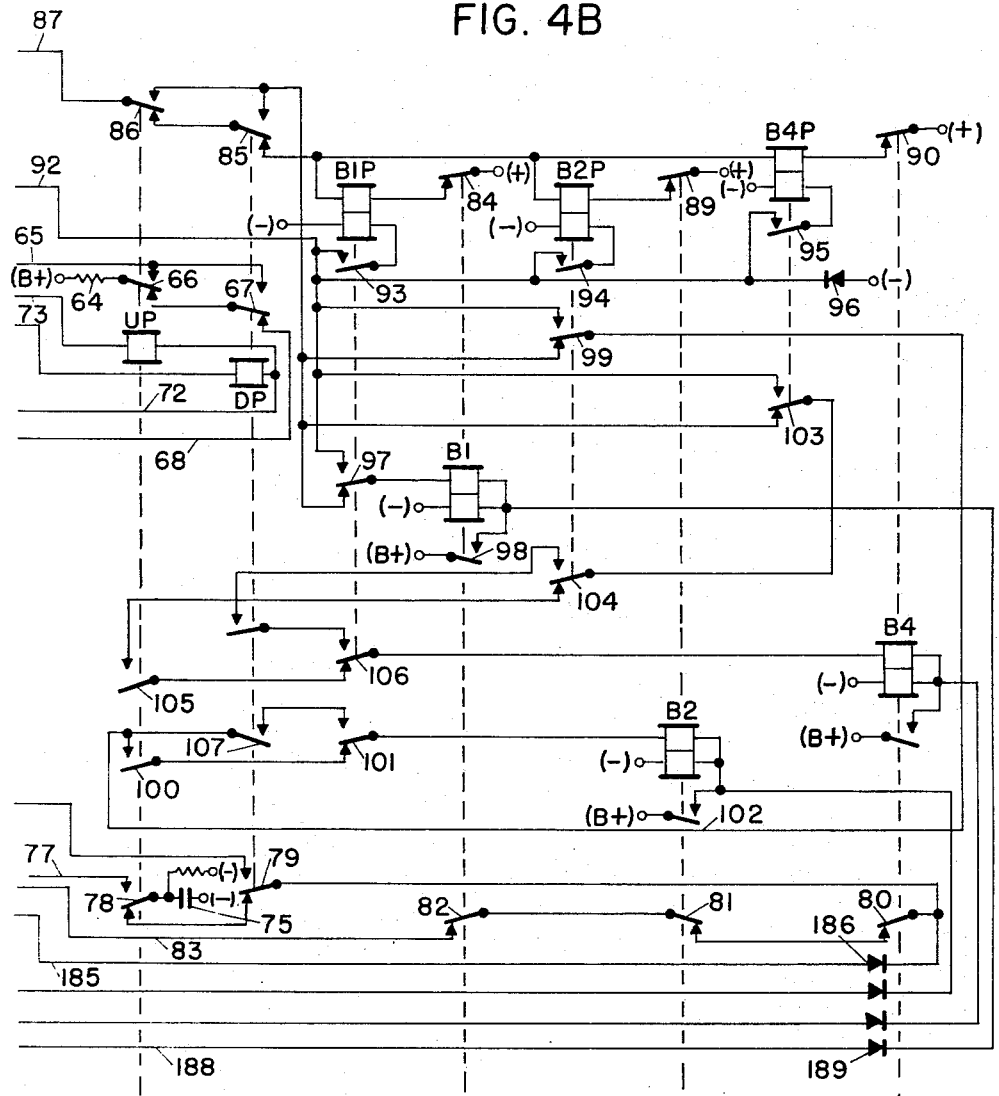
Figure 4C:
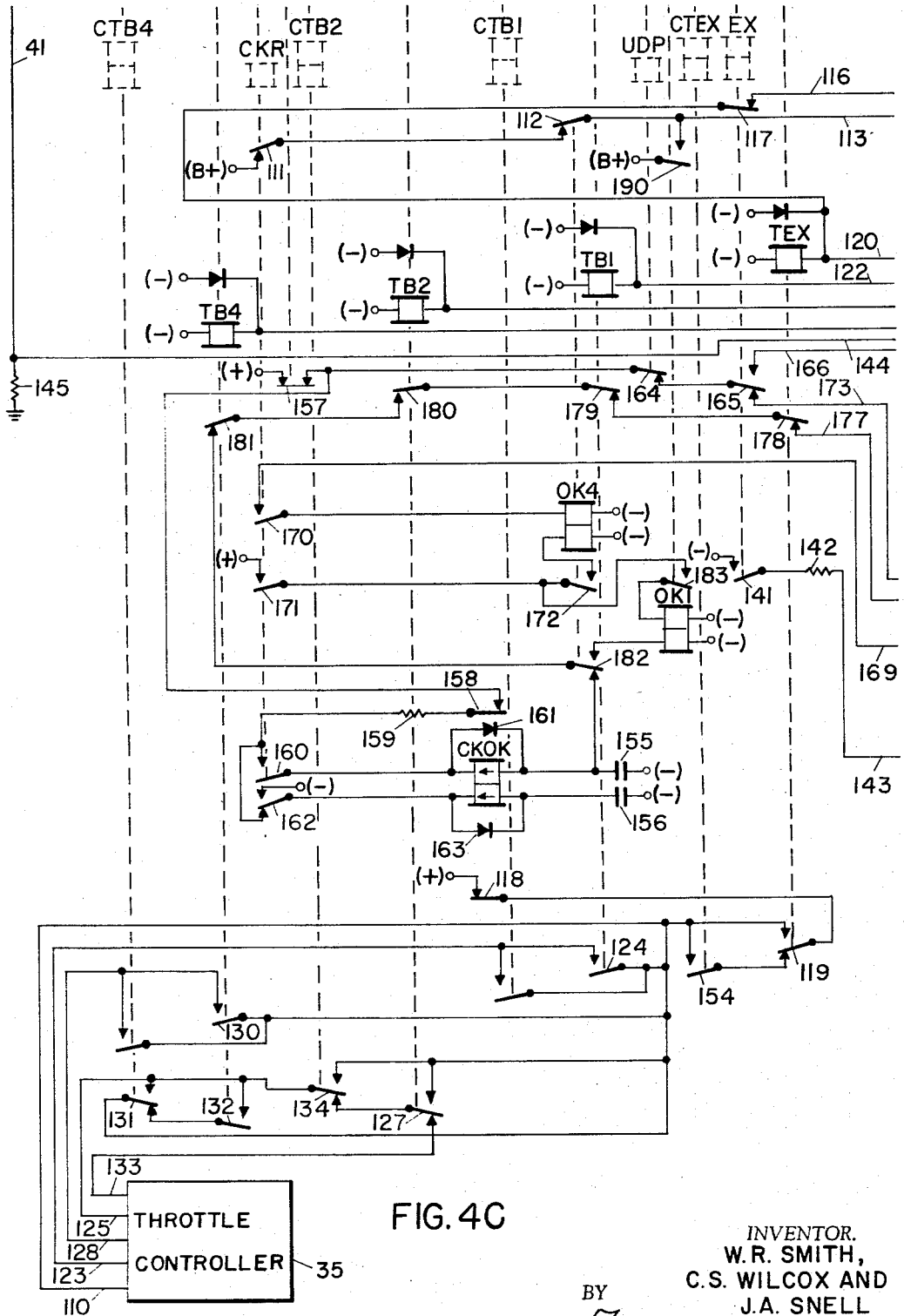
Figure 4D:
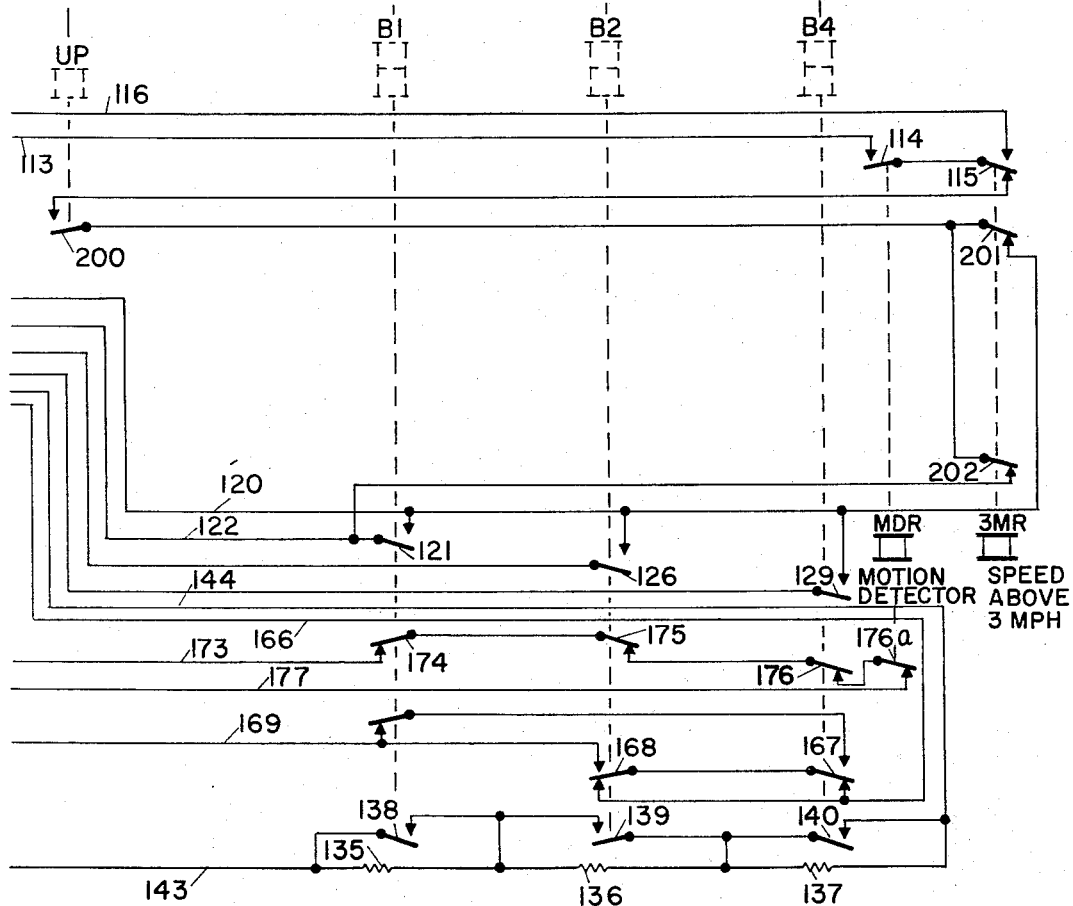
Figure 5:
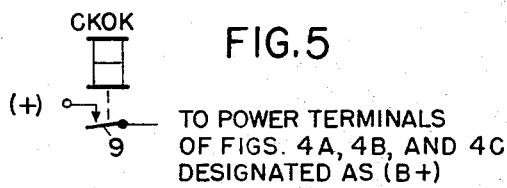

FIGS. 4A and 4B when placed side-by-side above FIGS. 4C and 4D illustrate circuit logic involved in the control of the tractive effort of a locomotive in accordance with a generated error signal; and FIG. 5 illustrates a particular power source selection that is used in the circuit logic of FIGS. 4A, 4B, 4C and 4D.

The symbols (+) and (−) have been used to indicate connections to the positive and negative terminals respectively of suitable batteries or other source of direct current, and the symbols (BX) and (CX) have been used to indicate connections to the instantaneous positive and negative terminals respectively of a suitable source of alternating current. This source of alternating current, can be, for example, at a frequency of 400 cycles. The symbol (B+) is used to indicate connection to the positive terminal of a suitable source of direct current through front contact 9 of a check relay CKOK as is shown in FIG. 5.

With reference to FIG. 1A, a vehicle V is illustrated having car couplings 7 and 8 at respective left-hand and right-hand ends equipped with strain gauges as is illustrated in FIGS. 1B and 1C. The vehicle V may be a helper locomotive, or it may be a control car to be coupled to the helper locomotive which can be equipped with control apparatus for automatically operating the helper locomotive. In the latter case, the helper locomotive is governed by direct wire connection to the control car. The strain gauges in the coupling at either end of the vehicle V can be selected for the control of the helper locomotive in accordance with the requirements of practice, such as, for example, in accordance with the direction of traffic. The couplings are provided with similar arrangements of strain gauges and similar circuits for generating force sensing signals. Therefore description of the arrangement of strain gauges in the coupling at the left-hand end of the vehicle V should be considered as typical of the arrangement that is provided in the car coupling at the right-hand end of the vehicle.

Although various arrangements of gauges can be used for sensing the force in a car coupling, the system illustrated may be considered preferably because this arrangement provides for both a checking bridge and a working bridge, each of which contains a strain gauge from all four sides of the coupling, and each of which contains two strain gauges in each side of the coupling, one of which is subject to longitudinal strain, and the other of which is disposed transversely relative to the car coupling and is subject to transverse strain. The reason for the strain gauges being disposed in this manner is that such arrangement provides a means for compensating for temperature changes in that changes in the characteristics of the transverse strain gauge 10 in the top of the coupling for example is compensated by changes in characteristics of the longitudinally disposed strain gauge 11. Strain gauges 12 and 13 are also disposed in the top of the coupling, the gauge 12 being disposed longitudinally and the gauge 13 being disposed transversely. Gauges 10 and 11 are used in a checking bridge CB as shown in FIG. 2, while gauges 12 and 13 are used in a working bridge WB. Thus there are two checking strain gauges and two working strain gauges that are provided in each of the four sides of each coupling, these gauges being disposed in the manner to compensate for changes in temperature. In the front side of the coupling, gauges 14 and 15 are used in the working bridge WB, and gauges 16 and 17 are used in the checking bridge CB. The bridges also contain strain gauges 18, 19, 20 and 21 that are disposed in the bottom of the coupling and strain gauges 22, 23, 24 and 25 that are disposed in the back side of the coupling. The gauges which are not shown in FIG. 1B are considered as being arranged in a manner similar to that which has been described for the gauges in the top and the front side of the coupling. In order to arrange the gauges in a compensating manner in the bridges CB and WB, both strain gauges of each bridge section are disposed in the same direction in the coupling, but the strain gauges are so arranged in each bridge that the four sections alternate as containing longitudinally and transversely disposed strain gauges respectively in the structure of the bridge. The checking bridge CB comprising strain gauges 10, 19, 16, 23, 22, 17, 18 and 11 is energized from a suitable source of alternating current through a suitable auto transformer 26 and through another transformer 27. This energization may be at any suitable frequency, such, for example, as at a frequency of 400 cycles. An output of the checking bridge CB is applied to an output wire 30 through an output transformer 28, an adjustable resistor 29 and contact 31 of a suitable left-right coupler selector 32. Similarly, the working bridge WB has an output applied to wire 33 through contact 34 of the left-right coupler selector 32. The auto transformer 26 provides a means for adjusting outputs of the bridges relative to forces measured by the strain gauges as a means for adjusting the share of the train loads to be pulled by the helper locomotive.

Figure 3:
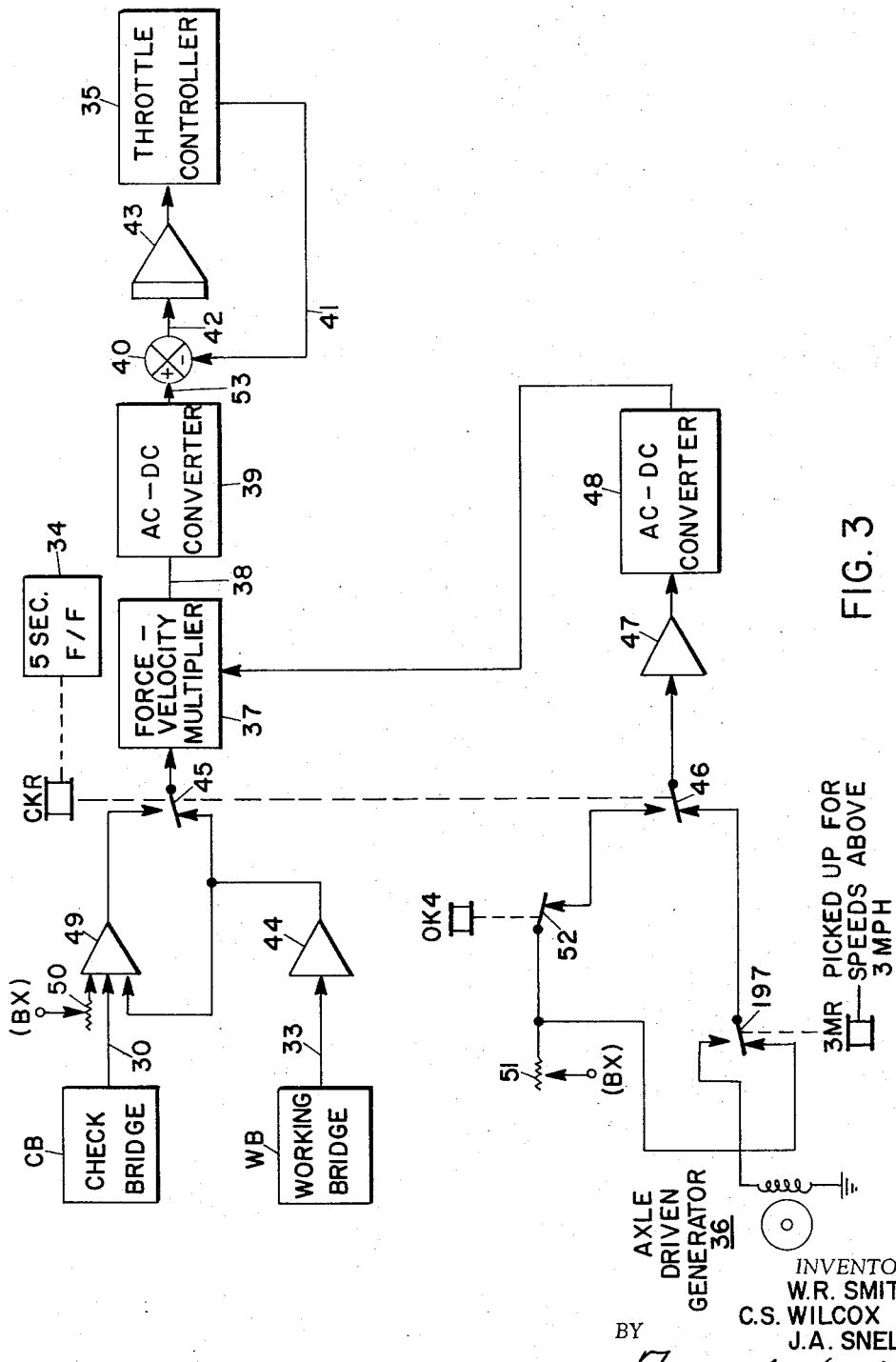
FIG. 3 illustrates by block diagram the general organization of the system according to the present invention.

The general organization of the system is shown in FIG. 3 for the selection of throttle settings in accordance with force sensing and vehicle speed measuring signals. The system is operable alternately in working and checking modes, these modes being selected by a relay CKR which is pulsed at regular intervals such as at 5 second intervals by a suitable flip-flop pulse generator 34. In the working mode, the throttle controller 35 is controlled by an output of computing apparatus which in turn has inputs governed by a working bridge sensing signal applied to wire 33 and by a speed sensing signal that is applied to an axle driven generator 36.

The computing organization multiplies a signal indicative of force in the coupling by a signal indicative of speed of the vehicle in a force-velocity multiplier 37. This generates an output alternating current signal applied to wire 38 which is indicative of the desired horsepower to be provided by the helper locomotive. This signal is applied through an A.C.-D.C. converter 39 over wire 53 to a deviation detector 40 in which the desired power signal is compared with a feedback signal selected in accordance with the throttle setting in the throttle controller 35 and applied to detector 40 over wire 41. A direct current (+) or (−) error signal on wire 42 is applied as an input to a suitable integrator 43. The output of the integrator 43 is used to select a throttle setting for the throttle controller 35.

Inputs to the computing apparatus are alternately working values or checking values as the relay CKR is pulsed to select alternately checking and working modes for the system.

In the working mode, when the train is in motion, the computing apparatus has an input applied to the force-velocity multiplier 37 from the working bridge WB. A force signal is applied to the force-velocity multiplier 37 at this time from the working bridge WB through wire 33, amplifier 44 and back contact 45 of relay CKR. A speed signal is applied to the force-velocity multiplier 37 at this time from the axle driven generator 36 through front contact 197 of relay 3MR, back contact 46 of relay CKR, amplifier 47 and A.C.-D.C. converter 48.

Upon the picking up of relay CKR to put the system into a checking mode, the force signal input to the computing apparatus from the working bridge WB is removed by the opening of back contact 45, and similarly the speed signal input to the computing apparatus that has been provided by the axle driven generator 36 is removed by the opening of back contact 46 of relay CKR. The checking mode substitutes a fixed signal input characteristic of force required at a fixed speed to compute a throttle setting within a predetermined range of settings. This signal is generated as an input to force-velocity multiplier 37 provided that the outputs of the bridges WB and CB are substantially the same. Thus the integrity of the force measuring means is checked each time the relay CKR is picked up. The output of checking bridge CB is applied over wire 30 to a summing amplifier 49. This force sensing signal is compared with an output of amplifier 44 which is characteristic of the force sensing signal of the working bridge WB, and if these signals are substantially the same, as they should be if the system is working properly, these signals cancel out, and the amplifier 49 has an output governed by a fixed input applied from a suitable source of alternating current through a variable resistor 50. This input signal is adjusted to correspond with a force signal from the coupling that would require a particular throttle setting such as a throttle setting number 4 for a particular speed of the train that could be, for example, 20 miles per hour. This fixed speed signal is generated in an adjustable resistor 51 and is applied through back contact 52 of relay OK4, front contact 46 of relay CKR, amplifier 47 and A.C.-D.C. converter 48 to the force-velocity multiplier 37. If the system checks properly during this checking interval so that the throttle controller is operated to select a throttle setting in the range from number 3 to number 5 throttle setting, the relay OK4 becomes picked up, and the picking up of this relay removes the fixed speed signal from the computing apparatus upon opening back contact 52. Thus there is no speed input into the force-velocity multiplier 37, and the computing apparatus should be operable to select an idle throttle setting for the throttle controller 35 due to removal of the speed signal. If this idle throttle setting is selected, the check relay CKR is permitted to drop away, and again apply an actual coupler force signal and an axle speed signal as inputs to the computing apparatus for determining the throttle setting of the locomotive. If the idle throttle setting is not selected when in the checking mode, the throttle is put to idle by deenergization of all throttle code wires connected to throttle controller 35.

With reference to FIGS. 4A, 4B, 4C and 4D, the throttle control system comprises circuit logic including a binary counter having relays B1, B2 and B4 for the respective stages of the counter together with associated repeater relays B1P, B2P and B4P. These relays are used, in combination with a field energization relay EX, to select any one of eight throttle settings. Throttle control relays TEX, TB1, TB2 and TB4 are used in the control of the tractive effort of the helper locomotive, these relays being conditioned in accordance with the condition of the counter. Storage relays CTEX, CTB1, CTB2 and CTB4 are used for storing throttle settings selected by the throttle control relays while the system is in a checking mode.

Up and down relays U and D respectively are provided for registering whether the output of integrator 43 calls for stepping the throttle up or down respectively, and an up-down repeater relay UDP is also associated with relays U and D. Relays UP and DP are provided for stepping the counter up and down respectively in accordance with the condition of the up and down relays U and D respectively.

Checking relays CKOK, OK4 and OKI are provided for registering the ability of the computing apparatus to perform properly when the system is in a checking mode. A relay MDR is provided for registering when the vehicle is in motion, and a relay 3MR is provided for registering when the speed of the vehicle is above a minimum speed such, for example, as 3 miles per hour.

Having thus considered the general mode of operation and the general organization of the system, more specific description will now be set forth as to the circuit logic involved under certain typical operating conditions.

*Counter operation*

It is desirable to have the counter operate at different speeds when the system is in the different modes so that the checking can be done quickly, while the changing of throttle settings is accomplished at a slower rate to obtain the most desirable mode of control for the locomotive. It is also preferable that the throttle be advanced at a slower rate than the rate used for decreasing the throttle. Thus the system can be controlled, for example, so that the counter can be stepped up at 12 second intervals for advancing the throttle and can be stepped down at 5 second intervals for decreasing the throttle. When the counter is operated in a checking mode, it is desirable that it be operated quickly so that the checking can be accomplished in a very short interval of time. The rate of counting to provide the mode of operation of the counter that has been described is selected by the integrator 43 (see FIGS. 3 and 4A). This integrator has a positive input on wire 42 for stepping the throttle up, and has a negative input on wire 42 for stepping the throttle down.

The relay CKR (see FIG. 4A) which has been described as being pulsed at regular intervals to select alternately the working and checking modes is used to select the rate of counting by selecting timing circuits for controlling the energization of the relays U and D by the integrator 43. If the relay CKR is in its dropped away position to select the working mode, the relay U can be picked up by the integrator if a positive input signal persists for enough time to charge capacitor 54 through back contact 55 of relay CKR, resistor 56, diode 57, and resistors 58 and 59 to ground. This selects the 12 second timing interval. If the input signal to the integrator 43 is of negative polarity, the capacitor 54 becomes charged when the system is in a working mode through resistor 60 and diode 61. This provides for the stepping down of the throttle at 5 second intervals. If the relay CKR is picked up to select a checking mode, the counter is operated at a relatively rapid rate as controlled by the capacitor 62 through front contact 55 of relay CKR.

To consider more specifically the mode of operation of the binary counter, it will be assumed that the system has just completed a successful integrity checking period, and the relay CKR has become dropped away. At this time the relays are all in their deenergized positions as is illustrated except for the relay CKOK which is maintained picked up because of intermittent successful integrity checking intervals. During the prior checking interval, the relay C has become dropped away because of the picking up of either a relay UP or a relay DP, and thus this relay has closed its back contact 63 to apply a shunt to the capacitor 62 for resetting the integrator 43. The resetting of the integrator 43 causes the dropping away of the relay U or D that has been picked up, and the dropping away of the repeater relay UDP. The relay C is picked up to terminate the reset interval in accordance with the energization of a circuit including resistor 64 (see FIG. 4B), back contact 66 of relay UP, back contact 67 of relay DP and wire 68. The picking up of this relay opens its back contact 63 to remove the shunt on the capacitor 54 or 62, dependent upon the position of relay CKR.

The integrator is now in condition to start its timing interval, and, assuming that the check relay CKR is in its dropped away position, the relay U becomes picked up, if the error signal input to the integrator is positive and persists for a time interval governed by the RC circuit. Upon the picking up of relay U, the relay UDP is picked up in accordance with the closure of front contact 69 of relay U. The relay UP (see FIG. 4B) now becomes picked up in accordance with the energization of a circuit including contact 70 of a suitable brake pressure switch 108 (see FIG. 4A) to register that the brakes of the locomotive are released, front contact 71 of relay UDP, wire 72, winding of relay UP, wire 73, back contact 74 of relay D and front contact 69 of relay U.

Upon the picking up of relay UP, capacitor 75 (see FIG. 4B) becomes charged through back contact 76 of relay EX, wire 77 and front contact 78 of relay UP. The picking up of relay UP has caused the dropping away of relay C by opening its circuit at back contact 66, and thus the relay C becomes dropped away to reset the integrator 43 and thus to cause the dropping away in turn of relays U and UP. When relay UP becomes dropped away, a pick up circuit is closed for the relay EX (see FIG. 4A) to energize this relay by the discharge of the capacitor 75. The upper winding of relay EX is connected across the capacitor 75 at this time through back contact 78 of relay UP, back contact 79 of relay DP, back contact 80 of relay B4, back contact 81 of relay B2, back contact 82 of relay B1, and wire 83. This relay is maintained picked up by a stick circuit including its front contact 76 until it is driven down by energization of its lower winding. The driving down of relay EX is rendered effective only when an idle throttle position is selected, as at the end of each checking period. The picking up of relay EX selects the first throttle setting provided all other relays of the counter are in their dropped away positions, in a manner to be hereinafter more specifically considered.

If the positive error signal still persists as an input to the integrator 43, a second pulse of the relay UP is effective to pick up the counter relay B1 (see FIG. 4B). Prior to this pulse, the back contact repeater relays B1P, B2P and B4P of the counter are picked up in accordance with relay EX being in its picked up position, and in accordance with the relays UP and DP both being in their deenergized positions at the end of the first pulse. Relay B1P is picked up through back contact 84 of relay B1, upper winding of relay B1P, back contact 85 of relay DP, back contact 86 of relay UP, wire 87 and front contact 88 of relay EX. Similarly, relay B2P is energized through back contact 89 of relay B2 and relay B4P is energized through back contact 90 of relay B4. When the second pulse of the integrator 43 causes the picking up of relay UP, a stick circuit is closed for relay B1P to maintain this relay energized until the relay UP becomes dropped away. This stick circuit includes resistor 64, front contacts 66 and 67 of relays UP and DP connected in multiple, front contact 91 of relay EX, front contact 93 of relay B1P and lower winding of relay B1P. The relays B2P and B4P are maintained energized through similar stick circuits including their front contacts 94 and 95 respectively. Diode 96 shunts the lower windings of relays B1P, B2P and B4P during the crossover time of the contacts of relay UP to insure that these relays will not be dropped away during this short interval of deenergization. The picking up of relay UP causes the picking up of the counter relay B1 through resistor 64, front contact 66 of relay UP, front contact 91 of relay EX, wire 92, front contact 97 of relay B1P and upper and lower windings of relay B1 connected in series. The picking up of this relay closes a circuit at its front contact 98 to maintain relay B1 picked up until it is driven down. In accordance with the picking up of relay B1, the pick up circuit for the relay B1P is opened at back contact 84 so that this relay is dropped away upon the dropping away of relay UP at the end of the pulse.

If the relay UP becomes picked up in accordance with the third pulse output of the integrator 43, the relay B1 becomes driven down by the energization of a circuit including its front contact 98, upper winding of relay B1, back contact 97 of relay B1P, front contact 86 of relay UP, wire 87 and front contact 88 of relay EX. At the same time that the relay B1 is being driven down, the relay B2 is being picked up by the energization of a circuit including resistor 64, front contact 66 of relay UP, wire 65, front contact 91 of relay EX, wire 92, front contact 99 of relay B2P, front contact 100 of relay UP, back contact 101 of relay B1P and windings of relay B2 connected in series.

During the fourth pulse, the relay B2 remains picked up, and the relay B1 becomes picked up by the energization of a circuit that has been described. In response to the fifth pulse, the relays B1 and B2 become driven down, and the relay B4 becomes picked up. Relay B1 is driven down by the energization of a circuit that has been described, and the relay B2 is driven down through its front contact 102, upper winding of relay B2, back contact 101 of relay B1P, front contact 100 of relay UP, back contact 99 of relay B2P, front contact 86 of relay UP, wire 87 and front contact 88 of relay EX. Also at the same time the relay B4 is picked up by the energization of a circuit for this relay including resistor 64, front contact 66 of relay UP, wire 65, front contact 91 of relay EX, wire 92, front contact 103 of relay B4P, back contact 104 of relay B2P, front contact 105 of relay UP, back contact 106 of relay B1P and windings of relay B4 connected in series. As the stepping progresses, the relay B4 is maintained picked up during the reception of the sixth, seventh and eighth pulses, the relay B1 continues to pick up on even pulses and drop away on odd pulses, and the relay B2 is picked up during the seventh pulse and is maintained energized through the eighth pulse.

The counter is reset by counting down. In other words, as the demand for tractive power of the helper locomotive becomes less than the power for a particular throttle setting, a negative input is applied to the integrator 43, and this input causes the pulsing of the down relay D and its repeater relay DP in a manner comparable to that which has been described for the pulsing of the UP relay U and its repeater relay UP. This down stepping continues until a null point is reached wherein there is insufficient negative input into the integrator 43 to pick up the relay D. From the circuit organization as it has been described up to this point, it will be readily apparent that the stepping up or stepping down of the counter is directed by the relays UP and DP. In other words, when a new count is called for, the count is either up or down in accordance with whether relay UP or relay DP is in its picked up position.

To consider a specific example of stepping down, it will be assumed that the counter has advanced to the condition where relays B1, B2 and B4 are all in their picked up positions. When a down-step pulse is generated and the relay DP is picked up, the relay B1 becomes driven down through front contact 98 of relay B1, upper winding of relay B1, back contact 97 of relay B1P, front contact 85 of relay DP, back contact 86 of relay UP, wire 87, and front contact 88 of relay EX. Relays B2 and B4 cannot be actuated at this time because their circuits are open at front contacts 101 and 106 of relay B1P.

To consider further stepping down of the counter, when the next down step pulse is received, the energization of relay DP causes the picking up of relay B1 and the driving down of relay B2. Relay B1 is picked up through front contact 67 of relay DP and a circuit that has been described, and the relay B2 is driven down by energization of a circuit including front contact 102 of relay B2, upper winding of relay B2, front contact 101 of relay B1P, front contact 107 of relay DP, back contact 99 of relay B2P, front contact 85 of relay DP, back contact 86 of relay UP, wire 87 and front contact 88 of relay EX. Relay B4 cannot be driven down at this time because it requires the relay B2P to be in its picked up position so as to close front contact 104. It will be readily apparent that in this manner the counter can be stepped back to zero, provided the error signal input to the integrator 43 is maintained of sufficient negative value to call for the selection of an idle throttle setting for the helper locomotive.

*Throttle control*

The system is adapted for the automatic operation of a locomotive requiring a particular coding of energization of 5 input wires to the locomotive throttle. These wires are shown as connected to the throttle controller 35 in FIG. 4C. The energization of only wire 110 of these 5 control wires provides for the energization of the locomotive field, and this corresponds to the first throttle setting. This setting is obtained in response to the counting relays being all in their dropped away positions with the relay EX in its picked up position. The picking up of relay EX causes the picking up of the throttle control relay TEX, and this relay is energized when the train is in motion by a circuit including back contact 111 of relay CKR, back contact 112 of relay OK4, wire 113, front contact 114 of relay MDR, front contact 115 of relay 3MR, wire 116, and front contact 117 of relay EX. Throttle control wire 110 is energized in accordance with the energized condition of relay TEX by a circuit including front contact 118 of relay CKOK and front contact 119 of relay TEX.

The second throttle position is selected when the relay B1 is picked up in combination with the relay EX being in its energized position. Under these conditions, the throttle control relay TB1 becomes energized by a circuit including back contact 111 of relay CKR, back contact 112 of relay OK4, wire 113, front contact 114 of relay MDR, front contact 115 of relay 3MR, wire 116, front contact 117 of relay EX, wire 120, front contact 121 of relay B1, and wire 122. For the second throttle setting, the wire 123 becomes energized in combination with the energization of the wire 110 through front contact 118 of relay CKOK, front contact 119 of relay TEX and front contact 124 of relay TB1.

For the third throttle setting, the wire 125 becomes energized in addition to the energization of wire 110. This is in accordance with the picking up of relay TB2 at a time when relay TB1 is in its dropped away position. Relay TB2 is picked up by a circuit similar to that which has been described for the energization of relay TB1 except that it is controlled through front contact 126 of relay B2. Wire 125 thus becomes energized through front contact 118 of relay CKOK, front contact 119 of relay TEX and front contact 127 of relay TB2.

For the fourth throttle position, the relays TB1 and TB2 are both energized at the same time, together with the relay TEX, and thus the control wires 110, 123 and 125 are energized jointly to provide the code characteristic of the fourth throttle position. The fifth throttle position is designated by the energization jointly of wires 110, 125, 128 and 133. Wire 128 is energized in accordance with the energization of relay TB4, which is energized through front contact 129 of relay B4. Energy is applied to wire 128 through front contact 118 of relay CKOK, front contact 119 of relay TEX and front contact 130 of relay TB4. For the sixth throttle position, all throttle control wires are energized in accordance with the joint energization of relays TEX, TB1 and TB4. Wire 125 is energized at this time through front contact 118 of relay CKOK, front contact 119 of relay TEX, back contact 131 of relay CTB4, and front contact 132 of relay TB4. Throttle control wire 133 is energized at this time through front contact 118 of relay CKOK, front contact 119 of relay TEX, back contact 131 of relay CTB4, front contact 132 of relay TB4, back contact 134 of relay CTB2 and back contact 127 of relay TB2. The seventh throttle position is selected jointly by the energization of relays TEX, TB2 and TB4. This provides for the energization of the throttle control wires 110, 125 and 128. The eighth throttle setting is obtained by the energization jointly by relays TEX, TB1, TB2 and TB4, which is effective to cause energy to be applied to all of the throttle control wires except for the wire 133.

The negative feedback signal applied to the detector 40 (see FIGS. 3 and 4A) to compare with the power desired signal fed into the detector 40, is selected by the counting relays B1, B2 and B4 rather than by the throttle control relays because it is necessary that this feedback signal be applied to detector 40 during both throttle control and checking modes. The feedback signal is selectively made more negative as the throttle settings increase in accordance with selective shunting of resistors 135, 136 and 137 by the front contacts 138, 139 and 140 of relays B1, B2 and B4 respectively. Energy is generated for the feedback circuit in accordance with the connection of a voltage divider circuit from the front contact 141 of relay EX (see FIG. 4C) to ground through resistor 142, wire 143, resistors 135, 136 and 137, wire 144 and resistor 145.

Because of the system being alternately in checking and working modes, a bank of throttle control code storage relays CTEX, CTB1, CTB2 and CTB4 (see FIG. 4A) is provided to store the working throttle code selected by the computing apparatus for the time interval during which the computer is operating in a checking mode to check the ability of the computer to compute given throttle settings. These storage relays become picked up to store the conditions of associated energized throttle control relays upon the system being put into a checking mode by the picking up of relay CKR. If the relay TEX is in its picked up position when the system is put into a checking mode, the storage relay CTEX becomes picked up by the energization of a circuit including front contact 146 of relay CKR, back contact 147 of relay OK1 and front contact 148 of relay TEX. The storage relay CTB1 becomes picked up if its associated relay TB1 is in its picked up position in accordance with the enclosure of front contact 149 of relay TB1. Similarly, the relays CTB2 and CTB4 become picked up in accordance with the closure of front contacts 150 and 151 of the relays TB2 and TB4 respectively. The relays TEX, TB1, TB2 and TB4 that may be energized with the system starts a checking mode, are deenergized by the picking up of relay CKR upon the opening of its back contact 111, but these relays are made sufficiently slow to drop away by having their windings shunted by diodes to insure the picking up of the associated storage relays. The storage relays CTEX, CTB1, CTB2 and CTB4 that are picked up are maintained energized during the checking mode by stick circuits for their lower windings which are closed through back contacts of their associated control relays TEX, TB1, TB2 and TB4 respectively. Relays CTEX, CTB1, CTB2 and CTB4 are made slow to drop away by their windings being shunted by diodes to cover the crossover time of the contacts of their associated relays in shifting from the pick up circuits to the stick circuits. Relay CTEX, for example, is maintained energized by a stick circuit including back contact 152 of relay TEX and front contact 153 of relay CTEX.

The throttle storage relays CTEX, CTB1, CTB2 and CTB4 maintain continuity in the throttle control circuit, during the checking mode, after the dropping away of the associated throttle control relays TEX, TB1, TB2 and TB4, because a contact of each storage relay is connected in multiple with a contact of its associated throttle control relay in the circuit logic governing the throttle controller 35. Thus the front contact 154 of relay CTEX, for example, is included in multiple with the front contact 119 of relay TEX so as to maintain a circuit closed for the throttle controller 35 upon the dropping away of relay TEX during the checking mode.

*Checking mode logic*

The checking system must be intermittently effective to obtain proper answers through the computing apparatus in order to maintain the check relay CKOK (see FIG. 4C) in its picked up position. It is necessary that this relay be in its picked up position to close its front contact 118 in order to permit the control of the throttle controller 35 according to the throttle setting selected by the computing apparatus. Relay CKOK is intermittently energized by the discharge of capacitors 155 and 156, which in turn can become charged intermittently only if the computing apparatus is checked as being operable to compute a particular throttle setting, to select an idle position for the throttle, and to check that the output of the working bridge is substantially the same as the output of the checking bridge. The capacitor 155 becomes charged when the relay CKR is in its picked up position through contact 157 of the brake pressure switch, front contact 158 of relay CKOK, resistor 159, front contact 160 of relay CKR and diode 161. When relay CKR is in its dropped away position, the capacitor 156 becomes charged through back contact 162 of relay CKR and diode 163. When the relay CKR is in its dropped away position, the capacitor 155 is discharged through the upper winding of relay CKOK and through back contact 160 of relay CKR to energize that winding in a direction to maintain relay CKOK picked up. Similarly, when the relay CKR becomes picked up, the capacitor 156 discharges through the lower winding of relay CKOK and through front contact 162 of relay CKR to maintain the relay CKOK in its picked up position.

The relay CKR is permitted to pulse in accordance with pulses provided every five seconds by the timer 34, only provided that the results of tests of the computer during the checking mode are satisfactory as registered by relays OK4 and OKI. Relay OK4 is picked up, when the system is in the checking mode, if the computer is operable to compute a throttle setting in the range of settings 3–5, and the relay OKI is picked up, when the system is in the checking mode, only if the computing apparatus is operable to select an idle throttle position after the relay OK4 has become picked up. If either of relays OK4 or OKI fails to pick up during a period of energization of the relay CKR, the relay CKR is maintained steadily energized by stick circuit energy, and this causes the dropping away of relay CKOK by failure to intermittently energize the capacitors 155 and 156 which are used in maintaining relay CKOK in its picked up position.

Upon the picking up of relay CKR, the counter is controlled by pulses at a relatively rapid rate from the integrator 43 (see FIG. 4A) in accordance with the selection of capacitor 62 to govern the rate of pulsing as has been described. The signal applied to wire 53 (see FIGS. 3 and 4A), when relay CKR is picked up, has been described as being a signal calling for power in accordance with fixed force and speed signals being fed into the computer. This signal is compared in the detector 40 with a feedback signal in accordance with the condition of the counter relay, these counter relays being in a position at the beginning of a checking interval corresponding to the actual throttle setting. If this setting is below the setting intended to be selected by the check signal, the relays U and UP become picked up to advance the counter, and similarly if the throttle setting of the locomotive is higher than the test range from setting 3 to setting 5, the feedback signal is higher than the input signal on wire 53, and thus the detector 40 has a negative output signal applied on wire 42, which is effective to cause the picking up of the down relay D and its repeater relay DP to step the counter down during the checking period. When the counter is stepped to the range from setting 3 to setting 5 and stops stepping, the relay OK4 becomes picked up. Thus if the counter is stopped at setting 3, for example, during the checking mode, the relay OK4 (see FIG. 4C) becomes picked up through front contact 157 of the brake pressure switch 108, back contact 164 of relay UDP, front contact 165 of relay EX, wire 166, back contact 167 of relay B4, front contact 168 of relay B2, wire 169 and front contact 170 of relay CKR. Back contact 157 of relay UDP in this circuit indicates that the stepping has stopped, because this relay is slow enough to drop away to be maintained picked up for successive check stepping pulses. The picking up of relay OK4 closes a stick circuit for its lower winding including front contact 171 of relay CKR and front contact 172 of relay OK4.

With reference to FIG. 3, the picking up of relay OK4 removes the fixed speed signal from the computer input at back contact 52. The removal of a speed input into the computing apparatus should cause the counter to be stepped down to zero and thus to select an idle position for the locomotive throttle. Because of there being a relatively high feedback signal applied to the detector 40 in accordance with the counter being at throttle setting number 3, the counter becomes stepped down in accordance with a succession of negative output pulses of the integrator 43. These pulses drive the counter to zero, and when the counter reaches this position, the relay EX (see FIG. 4A) is driven down by the energization of its lower winding through front contact 76 of relay EX, wire 83, back contacts 82, 81 and 80 of relays B1, B2 and B4 respectively and front contact 79 of relay DP. When this relay becomes dropped away, it removes feedback energy from the detector 40 by the opening of its front contact 141 (see FIG. 4C). With the relay EX in its dropped away position, the relay OKI becomes picked up in accordance with the energization of its lower winding through contact 157 of the brake pressure switch, back contact 164 of relay UDP, back contact 165 of relay EX, wire 173, back contacts 174, 175 and 176 of relays B1, B2 and B4 respectively, back contact 176a of relay MDR, wire 177, back contact 178 of relay TEX, back contact 179 of relay TB1, back contact 180 of relay TB2, back contact 181 of relay TB4 and front contact 182 of relay OK4. The picking up of relay OKI establishes a stick circuit for that relay including front contact 171 of relay CKR and front contact 183 of relay OKI.

Having registered that the computing apparatus is operable to compute the desired checking throttle setting by picking up relay OK4, and having checked that the counter can be reset upon removing the speed signal input to the computing apparatus by the picking up of relay OKI, the checking has been successful, and the counter is reset in accordance with the stored throttle setting. After this has been accomplished, the relay CKR can be released to put the system in a working mode and to provide a pulse for the energization of relay CKOK to maintain this relay energized.

The picking up of relay OKI renders the transfer of the storage in the storage relays CTEX, CTB1, CTB2 and CTB4 (see FIG. 4A) effective to reset the binary counter to correspond with the last computed working throttle setting. Relay EX becomes picked up by the energization of a circuit including front contact 146 of relay CKR, front contact 147 of relay OKI, front contact 184 of relay CTEX, wire 185, diode 186, back contacts 80, 81 and 82 of relays B4, B2 and B1, respectively, wire 83 and upper winding of relay EX. This relay is maintained energized by its stick circuit until it is driven down during the next check period. If the relay CTB1 is picked up, the relay B1 becomes picked up at this time through front contact 146 of relay CKR, front contact 147 of relay OKI, front contact 187 of relay CTB1, wire 188 and diode 189. Relays B2 and B4 become picked up by the energization of similar circuits if their associated storage relays CTB2 and CTB4 are in their picked up positions.

Having thus provided for transfer of the throttle code storage into the counter, the storage relays that are in their picked up positions at this time become deenergized in accordance with the repeating of the code out of the counter into the relays TEX, TB1, TB2 and TB4 (see FIG. 4C). The picking up of these relays corresponding to the code that has been put back into the counter should correspond with the code that has been stored in the code storage relays, and thus, if the proper relays TEX, TB1, TB2 and TB4 are energized, their corresponding storage relays will become dropped away because of the opening of the stick circuits for such relays. The relays TEX, TB1, TB2 and TB4 becomes picked up by the energization of circuits similar to those which have been heretofore described except that energy is applied to the circuits through front contact 190 of relay OKI. Until all of the storage relays become dropped away, the relay CKR is maintained picked up by a stick circuit. If the relay CTB1 is in its picked up position, the stick circuit includes front contact 146 of relay CKR, front contact 191 of relay CTB1 and back contact 192 of relay CTEX. A similar circuit is closed through front contact 194 of relay CTB2 or front contact 195 of relay CTB4. Should any of the storage relays CTB1, CTB2 and CTB4 fail to drop away at the end of the checking period, the relay CKR is maintained picked up, and the continued energization of this relay is effective to cause the dropping away of relay CKOK because of failure to pulse the relay CKR. This of course indicates that there has been a failure in the automatic control apparatus, and the throttle is reset to its idle position. After the relay CKR has become dropped away, the computing apparatus is shifted from a checking mode to a working mode, and the binary counter can again be adjusted in accordance with computing desired power in response to working bridge and actual speed input signals, and comparing a signal characteristic of such power with a feedback signal generated in accordance with the throttle setting as registered by the condition of the binary counter relays EX, B1, B2 and B4.

In order to insure that the binary counter becomes reset to zero so as to select an idle throttle setting for the locomotive in case the relay CKOK becomes dropped away, energy for the binary counter, and for the storage relays and certain other circuits is taken through a front contact 9 of relay CKOK (see FIG. 5) as is indicated by the power designation "(B+)."

*Starting the helper locomotive*

The helper locomotive first applies power in starting in accordance with the energization of special starting circuits before there is sufficient speed registered to provide an input into the integrator 43 in accordance with the actual speed of the train. The working bridge generates a signal at this time in accordance with the force exerted in the coupling by the main locomotive of the train. In order to obtain an input signal to the integrator 43 so as to initiate the power operation of the helper locomotive, a fixed speed signal is applied through a back contact 197 (see FIG. 3) of relay 3MR as an input to the computing apparatus.

Now that the computer has both force and speed input signals, it generates an output signal to cause the picking up of relay UP (see FIG. 4B), and when the main locomotive has set the train in motion so as to pick up the motion detector relay MDR (see FIG. 4D), the relay TEX (see FIG. 4C) becomes picked up when the system is in a working mode through back contact 111 of relay CKR, back contact 112 of relay OK4, wire 113, front contact 114 of relay MDR, back contact 115 of relay 3MR, front contact 200 of relay UP, back contact 201 of relay 3MR, and wire 120. The relay TM1 also becomes picked up by energization through back contact 111 of relay CKR, back contact 112 of relay OK4, wire 113, front contact 114 of relay MDR, back contact 115 of relay 3MR, front contact 200 of relay UP, back contact 202 of relay 3MR and wire 122. This provides for the operation of the throttle controller 35 to the second throttle position which is a position considered to be proper for the helper locomotive upon starting the train at low speed.

When the speed of the train reaches 3 miles per hour, the relay 3MR becomes picked up and stays picked up for higher speeds, and in accordance with the picking up of this relay, the start circuits just described are opened and the system operates according to the mode of operation that has been described, the system being controlled in accordance with an input signal through front contact 197 of relay 3MDR (see FIG. 3) characteristic of the actual speed of the train. The opening of back contacts 201 and 202 of relay 3MR (see FIG. 4D) causes the relays TEX and TB1 to be controlled according to the normal mode of operation of the system.

Having thus described one embodiment of the present invention as applied to the automatic operation of a vehicle, it is to be understood that this form is selected for the purpose of facilitating disclosure of the present invention rather than to limit the number of forms the present invention may assume. While the invention has been described in its preferred embodiment, it is to be understood that the words which have been used are words of description rather than of limitation and that changes within the purview of the appending claims may be made without departing from the true scope and spirit of the invention in its broader aspects.

What we claim is:

1. A system for controlling a locomotive in accordance with forces in a vehicle coupler comprising, first sensing means for generating a working signal characteristic of force in the coupler, second sensing means for generating a first checking signal characteristic of the force in the coupler, means for generating a fixed check signal, means for generating a signal characteristic of the actual speed of the locomotive, and computing means controlled by the working signal, the first checking signal, the fixed checking signal and the speed signal for alternately generating a signal characteristic of desired power for the locomotive and a test signal.

2. The system according to claim 1 wherein means is provided for controlling the tractive effort of the locomotive in accordance with the desired power signal provided that the test signal is within a fixed limited range of values.

3. The system according to claim 2 wherein the working signal and the checking signal must be in always the same fixed ratio of values in order that the test signal may be in the fixed limited range of values.

4. The system according to claim 3 wherein the working signal and the checking signal must be substantially the same values in order that the test signal may be in the fixed limited range of values.

5. A system for controlling a locomotive in accordance with force in a vehicle coupling comprising, a working bridge controlled by the force in the vehicle coupling for generating a working force signal, a check bridge controlled by the force in the vehicle coupling for generating a checking force signal, computing means for at times combining at least the working force signal and the checking force signal during a test interval for obtaining a predetermined fixed output signal irrespective of the force in the coupling if the working force signal and the checking force signal are substantially the same, said computing means being effective at other times to select a power throttle setting for the locomotive in response jointly to the working force signal and a vehicle speed signal, and control means operable to control the tractive effort of the locomotive in accordance with the power throttle setting only provided the fixed output signal is intermittently generated by the computing means.

6. The system accordance to claim 5 wherein means is provided for intermittently checking the ability of the computing means to select a proper throttle setting in response to fixed force and speed input signals.

7. A system for controlling the tractive effort of a locomotive in accordance with a generated signal comprising, integrating means controlled by the signal for providing output pulses at time spaced intervals as long as the signal exists, counting means for counting the output pulses, feedback means governed by the counting means for decreasing the value of the signal as the counting progresses, checking means intermittently effective to govern the value of the signal at the beginning of a checking cycle in a manner to cause the counting means to stop within a predetermined range of counts, storage means operable except when the checking means is effective to register the count registered by the counting means, control means controlled by the storage means for selectively controlling the tractive effort of the locomotive in accordance with the count registered in the storage means, and means for rendering the control means effective only so long as the checking means is intermittently effective to stop the counting means within the predetermined range of counts.

8. The system according to claim 7 wherein the integrating means provides output pulses at a faster rate when the checking means is effective than when the checking means is ineffective.

9. A system for the automatic control of a helper tractive power vehicle having means for generating a signal characteristic of force in a vehicle coupling, means for generating a signal characteristic of the speed of the vehicle, means for generating a feedback signal characteristic of the tractive power developed by the vehicle and computing means combining the force signal, the speed signal and the feedback signal for selecting one of a plurality of throttle settings to control the tractive power of the vehicle, in which the improvement comprises, (a) checking means including fixed value signals intermittently substituted for the force and speed signals respectively, irrespective of the actual forces in the coupling and actual vehicle speed, for checking the ability of the computing means to select a proper throttle setting in accordance with the fixed value inputs, and (b) control means rendered operable by the intermittent selection of said proper throttle setting by the checking means for governing the tractive power of the vehicle in accordance with the throttle setting selected by the computing means when the computing means is governed by the force and speed signals.

10. The invention according to claim 9 wherein checking means is effective intermittently to test the ability of the computing means to select each of a plurality of different proper throttle settings in response to respective different sets of fixed value inputs, and wherein means is provided for rendering the control means operable only provided that all of the different proper settings are intermittently computed when the computing means is governed by the fixed value settings.

References Cited

UNITED STATES PATENTS

| | | | |
|---|---|---|---|
| 3,192,382 | 6/1965 | Allison | 246—182 |
| 3,217,662 | 11/1965 | Hughson et al. | 105—1 |
| 3,217,663 | 11/1965 | Hughson | 105—1 |
| 3,268,724 | 8/1966 | Hayashi et al. | 246—182 |

ARTHUR L. LA POINT, *Primary Examiner.*

J. E. BABER, *Assistant Examiner.*